T. CHUTAUX
Electric Battery.
No. 105,043. Patented July 5, 1870.
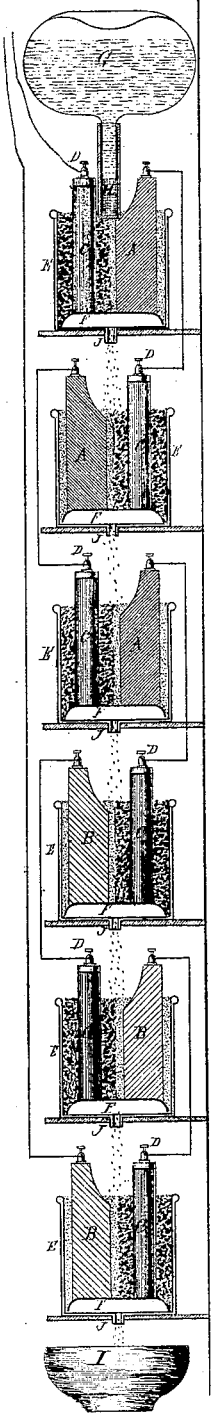
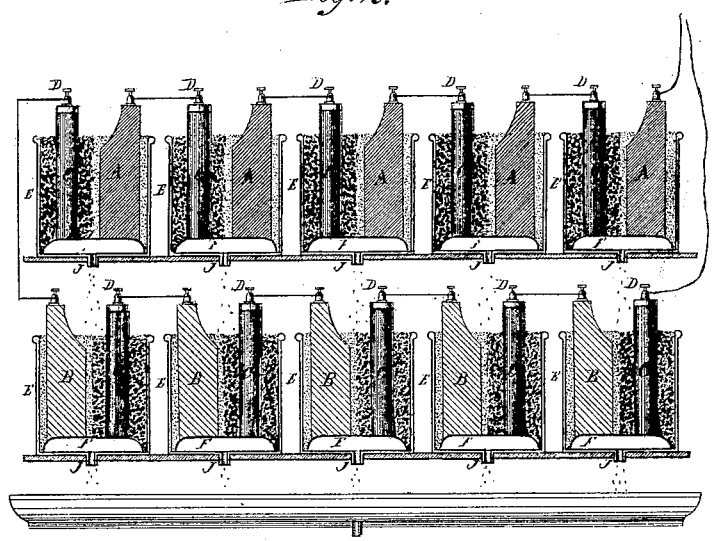

United States Patent Office.

THÉOPHILE CHUTAUX, OF PARIS, FRANCE.

Letters Patent No. 105,043, dated July 5, 1870.

IMPROVEMENT IN ELECTRIC BATTERIES.

The Schedule referred to in these Letters Patent and making part of the same.

To all whom it may concern:

Be it known that I, THÉOPHILE CHUTAUX, of Paris, in the Empire of France, have invented a new and useful Improvement in Electric Batteries; and I do hereby declare the following to be a full, clear, and exact description thereof, which will enable those skilled in the art to make and use the same, reference being had to the accompanying drawing forming part of this specification, in which drawing—

Figure 1 is a sectional view of this improved battery, the cells being placed one above the other.

Figure 2 is a sectional view of another battery applied horizontally, a row of cells being represented above another row of the same number.

Similar letters indicate corresponding parts.

My invention relates to certain improvements in electric batteries, which present the advantages of rendering them almost everlasting, avoiding the necessity of cleansing them or renewing the elements, maintaining their force, preventing chemical collections and agglomerations, and saving the expense of keeping in order and renewing.

These improvements consist, in the first place, in arranging the cells one above the other on shelves fixed to a wall or an upright, and in placing the elements of each cell in a vessel having a hole in its bottom, through which the exciting fluid runs from one cell to the other, being originally placed in a reservoir above the first cell, and from there passing through a porous cylinder, and dropping through the pores of the same into the first cell.

The second part of said improvements is, that the cells consist—

First, each of those of the upper half of the number of a piece of iron, and of the other half of a piece of zinc, which pieces of metal are of a volume proportionate to the duration desired.

Second, of a piece of coke, covered with a layer of copper by the electro-metallurgic process, or with an ordinary cap on its upper end, to which layer or cap is soldered the screw connecting two cells together.

Third, of fine sand surrounding the zinc or iron in the vessel, and of powdered coke surrounding the solid piece of coke in the same.

Fourth, of a half oblate sphere reversed and placed at the bottom of the said vessel, upon which are the elements and under which collects the exciting fluid, which drops, as described, through the holes from one cell to another, after passing through the sand and powdered coke.

The exciting fluid employed is azotic or nitric acid diluted in water. But in certain cases, iron or zinc may be used exclusively for all the cells; and, when iron is used exclusively, the azotic acid is preferred, but if, on the other hand, zinc is used exclusively, the bichromate of potash, the bisulphate of mercury, and sulphuric acid, combined and diluted in water, are preferred.

In the drawing—

A represents the piece of iron, proportionate in size to the time the battery is desired to last, placed in the upper cells.

B, the piece of zinc for the lower ones.

C, the block of coke in each cell, whose end, as represented, is fitted with a cap of copper, as has been explained, to which is soldered the screw D, connecting the opposite poles of the battery.

E is the vessel or cell containing the elements, the sand and the powdered coke, through which passes the exciting fluid.

F is the reversed half oblate sphere, made of porcelain, glass, or earthenware, at the bottom of each vessel.

G, the receptacle above the uppermost cell, containing the exciting fluid in reserve.

H, the porous cylinder, connected to the neck of said reservoir, through which the liquid escapes by its pores.

I is the other receptacle, into which the impoverished and spent liquid flows after traversing all the cells, and which is placed underneath the lowest cell.

J is the pipe or aperture at the bottom of each vessel, underneath the half oblate sphere F, by means of which the fluid flows from one cell into another.

The exciting fluid issuing from the receptacle G filters through the porous cylinder H, spreads throughout the first cell, damping the sand and pounded coke, and, finally, collecting under the half sphere F, passes through the aperture J into the next cell, where it produces a similar effect, and successively passes into all the cells.

In order to arrange the elements, and to separate them so as to prevent them mixing the sand and the coke together, the following system must be followed:

A movable partition divides the vessel into two parts, and the sand and coke are then introduced; when the iron or zinc and the solid block of coke are respectively completely surrounded by the sand and the pounded coke, the partition is withdrawn and the sand and the pounded coke left in contact with one another's vertical surfaces, without mixing together.

If the azotic or nitric acid diluted with water is used for the exciting liquid, after having been in contact with the sides of the elements in the upper half of the cells containing the iron, becomes, from the simple fact of this contact, nitrate of iron, which, by its contact with the zinc in the lower cells, suffices of itself to produce the electric action.

As has been stated, the metal subject to the action may be made to last as long as desired by calculating its volume proportionately.

It is obvious that the economy of time and of the exciting fluid employed, resulting from this arrangement, is immense.

The arrangement represented in fig. 2 consists in simply placing the cells containing the iron above and those containing the zinc below. The construction and action of this battery in other respects perfectly resembles the one just described. The impoverished and spent liquid runs off through the pipes or apertures under the half spheres into any suitable long trough placed underneath the lower row of cells.

My battery may be particularly well adapted for marine use, or for military telegraph work, the shaking to which a battery is always subject in these cases producing but little effect on my battery, in consequence of the cohesion produced by the damp sand and pounded coke filling up the empty spaces.

Having thus described the nature of the said invention, and the manner of performing the same, I would have it understood that I do not confine myself to the precise details herein described and shown, as these may obviously be modified without departing from the principle of my invention; but

What I claim as new, and desire to secure by Letters Patent, is—

1. The arrangement of the cells one above the other on a horizontal or vertical frame, as described and set forth.

2. The combination of zinc and iron in electric batteries, the iron in the upper half of the cells, and the zinc in the lower half of the same, as described and set forth.

T. CHUTAUX.

Witnesses:
H. BONNEVILLE.
H. MORTON.